US008629868B1

(12) United States Patent
Gardiner et al.

(10) Patent No.: US 8,629,868 B1
(45) Date of Patent: Jan. 14, 2014

(54) SYSTEMS AND METHODS FOR SIMULATING DEPTH OF FIELD ON A COMPUTER GENERATED DISPLAY

(75) Inventors: Harold Dee Gardiner, Sandy, UT (US); David A. Buckmiller, Salt Lake City, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 525 days.

(21) Appl. No.: 12/895,651

(22) Filed: Sep. 30, 2010

(51) Int. Cl.
*G06T 15/00* (2011.01)
*G09G 5/00* (2006.01)

(52) U.S. Cl.
USPC .......................................... 345/419; 345/611

(58) Field of Classification Search
None
See application file for complete search history.

(56) References Cited

U.S. PATENT DOCUMENTS

| | | | | |
|---|---|---|---|---|
| 6,839,125 B2 * | 1/2005 | Hansen | ........................... | 355/67 |
| 6,975,329 B2 * | 12/2005 | Bastos et al. | ................... | 345/587 |
| 7,428,001 B2 * | 9/2008 | Schowengerdt et al. | ........ | 348/51 |
| 7,876,332 B1 * | 1/2011 | Donham et al. | .............. | 345/619 |
| 8,035,641 B1 * | 10/2011 | O'Donnell | ..................... | 345/420 |
| 8,285,030 B2 * | 10/2012 | Zhou et al. | ..................... | 382/144 |
| 2009/0153576 A1 * | 6/2009 | Keller | ............................ | 345/581 |

OTHER PUBLICATIONS

Hillaire, S. et al., "Depth-of-Field Blur Effects for First-Person Navigation in Virtual Environments," IEEE Computer Graphics and Applications, Nov./Dec. 2008, pp. 47-55.*
T. Zhou, et al., "Accurate Depth of Field Simulation in Real Time," Computer Graphics forum, vol. 26 (2007), No. 1 pp. 15-23.*
Adobe After Effects CS5* Lens Blur effect. Website: http://help.adodbe.com/en_US/aftereffects/cs/using/WS3878526689cb91655866c1103a9d3c597-7ba6.html, 2 pages printed on Jan. 26, 2011.
Bauer, P., Photoshop How-To: Lens Blur with Alpha Channels, written on Jan. 18, 2005. Website: http://www.creativepro.com/article/photoshop-how-to-blur-with-alpha-channels, 3 pages printed on Jan. 26, 2011.
Demers, J., Nvidia, GPU Gems—Chapter 23. Depth of Field: A Survey of Techniques. http://http.developer.nvidia.com/GPUGems/gpugems_ch23,html, 19 pages printed on Mar. 3, 2011.
Lyons, Ian, Lens Blur Filter in Action, Computer Darkroom, Adobe Photoshop cs. Website: http://www.computer-darkroom.com/tutorials/tutorial_9_1.htm, 7 pages printed on Jan. 27, 2011.
Riguer, G., et al., Real-Time Depth of Field Simulation, printed from: http://developer.amd.com/media/gpu_assets/ShaderX2_Real-TimeDepthOfFieldSimulation.pdf, 30 pages, printed on Mar. 3, 2011.
Rokita, P., Generating Depth-of-Field effects in virtual reality applications, IEEE Computer Graphics and Applications, vol. 16, Issue 2, Mar. 1996, pp. 18-21.
Wikipedia—Depth of field. Website: http://en.wikipedia.org/wiki/Depth_of_field, 32 pages printed on Jan. 26, 2011.

* cited by examiner

*Primary Examiner* — Kee M Tung
*Assistant Examiner* — Yi Wang
(74) *Attorney, Agent, or Firm* — Donna P. Suchy; Daniel M. Barbieri

(57) ABSTRACT

A system for simulating depth of field in a computer graphics display is provided according to an exemplary embodiment. The system comprises an image generation circuit configured to generate an image representing a plurality of objects for display on the computer graphics display. The image generation circuit is configured to generate the image using a single blur parameter for each of the plurality of objects that represents both a magnitude of blur and a relative distance with respect to a lens focal distance being simulated by the image generation circuit.

14 Claims, 10 Drawing Sheets

SYSTEMS AND METHODS FOR SIMULATING DEPTH OF FIELD ON A COMPUTER GENERATED DISPLAY

BACKGROUND

The present disclosure relates generally to the field of graphical imaging systems.

Depth of field is a portion of a scene as viewed through a lens that appears acceptably sharp in the image. A lens can only precisely focus at one distance and decreases in sharpness occur on each side of the focused distance. In other words, objects within a lens's depth of field appear as in-focus, while objects closer or further than the depth of field will appear out of focus.

In some applications it is desirable to simulate the effects of depth of field in a computer generated image. For example, some modern flight simulators can be used not only to simulate an out-the-window scene, but also an image presented in the cockpit by an optics-based (e.g., lens-based) sensor. It is challenging and difficult to simulate depth of field effects in an efficient manner (e.g., suitable for real-time applications such as flight simulation).

SUMMARY

One exemplary embodiment of the disclosure relates to a system for simulating depth of field in a computer graphics display. The system comprises an image generation circuit configured to generate an image representing a plurality of objects for display on the computer graphics display. The image generation circuit is configured to generate the image using a single blur parameter for each of the plurality of objects that represents both a magnitude of blur and a relative distance with respect to a lens focal distance being simulated by the image generation circuit.

Another exemplary embodiment of the disclosure relates to a method of anti-aliasing an image. The image has a plurality of pixels and a plurality of objects represented therein. The method comprises retrieving a blur value and a relative distance for each of a plurality of subpixels of each pixel. The method further comprises determining an anti-aliasing output for each pixel based on the blur values and relative distances of the subpixels of the pixel. The anti-aliasing output for each pixel is determined using a non-averaging method such that the blur values of the subpixels are not averaged to determine the anti-aliasing output of the pixel. The method further comprises providing the determined anti-aliasing output for each pixel.

Yet another exemplary embodiment of the disclosure relates to a system for simulating depth of field in a computer graphics display. The system comprises an image generation circuit configured to generate an image representing a plurality of objects for display on the computer graphics display. The image generation circuit is configured to generate the image using, for each of the plurality of objects, a blur magnitude and a relative distance with respect to a lens focal distance being simulated by the image generation circuit. The image generation circuit is configured to simulate depth of field in the image using a spatially variant filter. The spatially variant filter has weight values associated with one or more of the plurality of pixels. Each weight value is based on a blur magnitude and a relative distance for one or more neighboring pixels. The spatially variant filter is configured to blur one or more pixels of the image to achieve a simulated depth of field.

DETAILED DESCRIPTION

Referring generally to the figures, systems and methods for generating images having a depth of field are shown according to various exemplary embodiments. The disclosed systems and methods may be used, for example, to generate images simulating what may be captured by an optics-based sensor having a particular (e.g., fixed or variable) focal distance and/or depth of field. Various exemplary embodiments described herein may be less complex (e.g., requiring less computer processing power) than other methods of generating images having a depth of field and may enable such images to be generated substantially in or near real-time. The speed associated with the systems and methods described herein may make them useful in real-time or quasi real-time implementations such as training systems, where images must be dynamically generated based on user inputs. For example, a flight simulation system requires that flight training images be dynamically generated based on decisions made by a pilot of the simulation system. The systems and methods described herein may also be useful in other applications, such as medical imaging systems or games.

Figure 1:
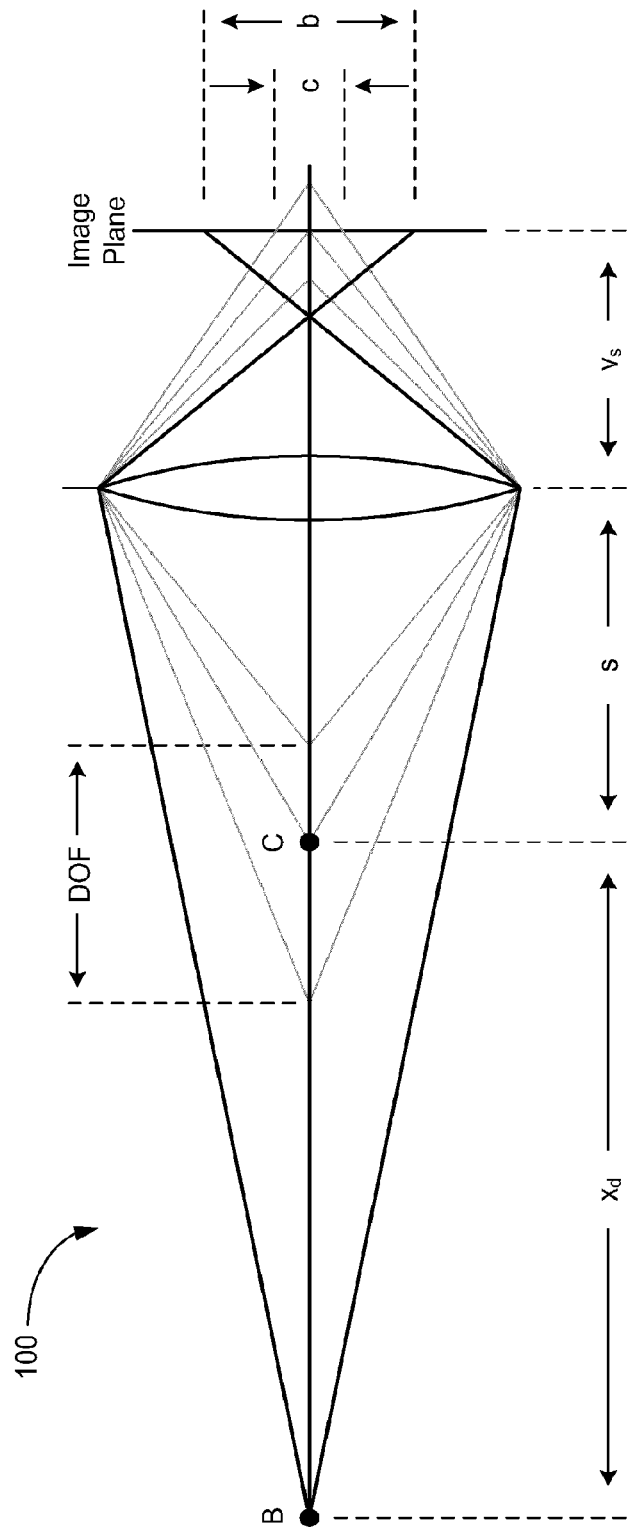
FIG. 1 is a diagram of an optical lens, according to an exemplary embodiment.

FIG. 1 illustrates a diagram of an optical lens capturing a scene including objects B and C. Object C is precisely focused on the image plane that is at a location that is a distance $v_s$ behind the lens. Object B is a distance $x_d$ away from (i.e., beyond) the focus distance s. Because object B is outside of the lens' depth of field, object B will project a fuzzy image b on the image plane. Objects relatively close to the focus distance s that fall within the depth of field (DOF) band will be perceived as being in focus. The size of the depth of field can be adjusted by modifying the focal length of the lens f, the magnification $m_s$, or the f-stop size of the aperture N. The amount of blur that an object casts into the image is a function of the lens characteristics and the object's position relative to the focus distance. For example, to determine the amount of blur associated with fuzzy image b, the mathematical relationship is defined as follows:

$$blur_b = \frac{(f * x * m_s)}{N} * x * \left(\frac{x_d}{s \pm x_d}\right)$$

Given known lens characteristics, if the distance of an object relative to the focus distance is known, the amount of blur that should be applied to the object can be computed. Similar computations may be made in applying a "lens blur" filter to simulate depth of field after a photograph has been taken; in applying such a filter, the user must first define the distance relationship of each pixel relative to the focus distance.

In some embodiments, the relative distance $x_d$ between the position of object B and the focal distance may not be known, but the position of object B (e.g., a distance D from the lens to object B) may be known. In such an embodiment, if the focus distance s is known, the relative distance $x_d$ can be computed as follows:

$$x_d = |D - s|$$

Once the blur value has been determined for each object and/or pixel in an image, the blur values must be applied to the image to properly simulate a depth of field. An image can be blurred, for example, by applying a convolution filter to the image. By dynamically changing the shape and size of the convolution filter, different amounts of blur can be achieved.

Various conventional methods of applying blur may be utilized to simulate depth of field. Ray tracing is one such solution. Ray tracing accurately models the behavior of light rays passing through on optical lens. Ray tracing may produce accurate results but requires substantial computing power and/or processing time and, accordingly, may not be suitable for real-time or near real-time applications. Accumulation buffers are another conventional solution. Accumulation buffers utilize multiple views of a scene rendered from slightly offset camera positions. The sum of the views are used to produce the simulation of the depth of field. As with ray tracing, accumulation buffers may produce accurate results but require processing power that may be unsuitable for real-time or near real-time applications. Yet another conventional solution involves generating two images of a scene, one that is in focus and one that has been blurred, and using a lens blur function to blend the two images together. The multiple renderings or passes required by this approach make it unsuitable for real-time or near real-time applications.

Yet another conventional solution utilizes programmable shaders in a multi-pass approach. On the first pass, the scene is rendered and the distance to each object and blur value or factor for each object is stored in a frame buffer along with the color of the object. On the second pass, a spatially variant convolution filter is applied to achieve varying amounts of blur. This solution addresses the problem of edge bleeding (discussed herein with reference to FIG. 3) but may reduce overall image quality. Further, a multi-pass approach may require too much processing time to be suitable for real-time or near real-time applications.

A computer generated image can be blurred to simulate depth of field by applying a filter such as a convolution filter. The amount of blur applied to an image is related to the size of the filter kernel.

The type, or look, of the blur is related to the shape (e.g., amplitude) of the filter kernel. The blur caused by an optical system is referred to as bokeh. The filter kernel can be adjusted to simulate the bokeh of a desired optical system. Several different types, or shapes, of filter kernels may be used to simulate depth of field in an image, including Gaussian filter kernels, box filter kernels, conical filter kernels, pyramid filter kernels, and/or other types of kernel shapes.

One method of applying blur (e.g., in real-time or near real-time) is to apply a convolution filter to the image. The size and/or shape of the filter kernel may be initially defined to handle the maximum amount of blur that may be applied to the image. The filter kernel may then be made spatially variant to reduce the amount of blur for objects that are closer to the focal depth. The design and application of spatially variant filters is discussed in further detail herein with respect to the exemplary embodiments shown in FIGS. 5 through 6B.

Figure 2:
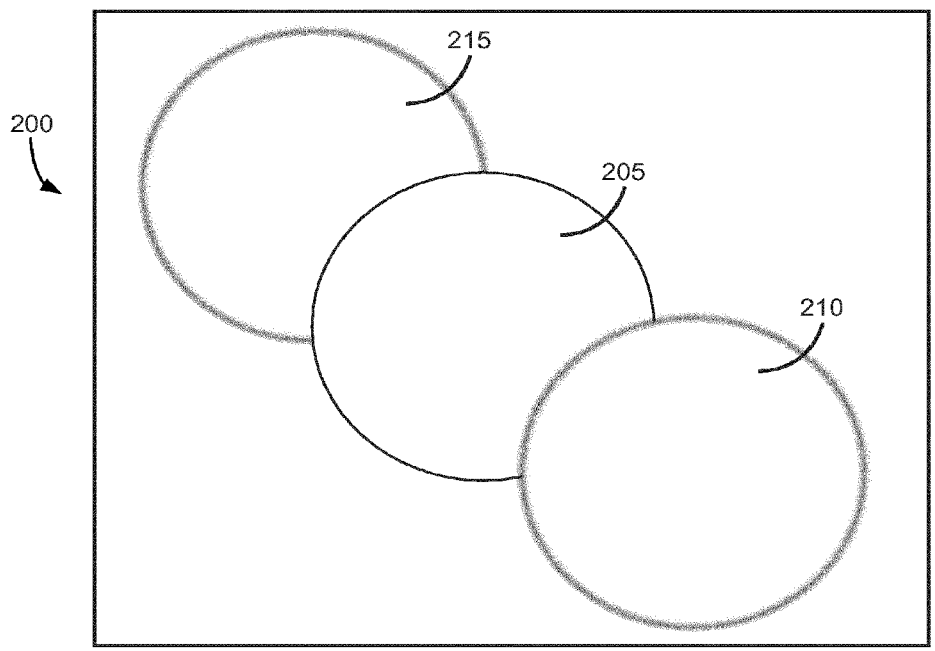
FIGS. 2 and 3 are illustrations of images having depths of field, according to exemplary embodiments.

Referring now to FIG. 2, an image 200 having a depth of field is shown according to an exemplary embodiment. Image 200 is an image that may result from a properly simulated depth of field. Image 200 includes several objects, including objects 205, 210, and 215, positioned at various levels of depth (i.e., various distances from a camera lens or simulated camera lens). Sphere 205 is positioned within the depth of field area and appears to be in focus. Objects closer than the focus distance in the field of view (i.e., near-field) of an image, such as sphere 210 in image 200, appear blurry and obscure (e.g., blur) the objects (e.g., the in-focus objects) behind them. Objects further away than the focus distance in the field of view (i.e., far-field) of an image, such as sphere 215 in image 200, appear blurry but do not blur objects that are closer in the field of view.

Figure 3:
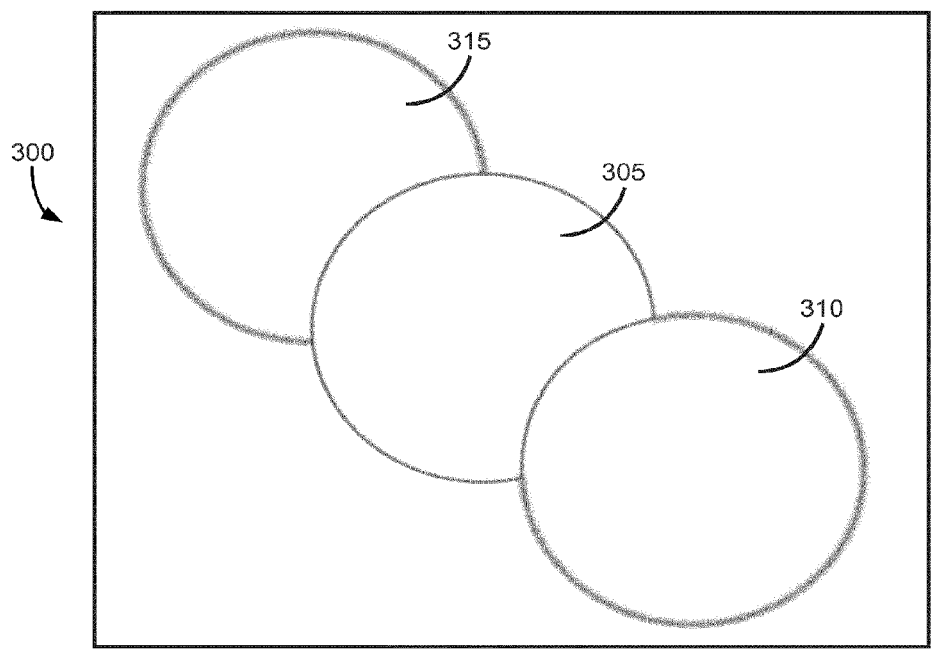

Referring now to FIG. 3, an image 300 having a depth of field is shown according to an exemplary embodiment. Image 300 is an image that appears similar to image 200 but that may result from simulating depth of field without accounting for distance relationships between objects in the image. In image 300, sphere 305 is an in-focus object, sphere 310 is a near-field object, and sphere 315 is a far-field object. Portions of the edge of sphere 310 that overlap the background (i.e., edges that do not overlap circle 305) appear appropriately blurry. However, where the edge of sphere 310 overlaps sphere 305, the edge incorrectly appears sharp. Further, the edge of sphere 305 appears to blur or bleed out into the background despite the fact that sphere 305 is within the depth of field range.

Referring generally to FIGS. 4 through 9, methods and systems for simulating depth of field in an image to be presented on a display are described according to various exemplary embodiments. Various systems and methods described below are less processor intensive than other available methods of simulating depth of field and are suitable for real-time or near real-time applications. Embodiments described herein may be implemented using a single pass and may not require multiple renderings or passes. In some embodiments (e.g., real-time applications), methods and systems described herein may not utilize ray tracing and/or accumulation buffers. In other embodiments, methods and systems described herein may be used in conjunction with ray tracing and/or accumulation buffer solutions. Further, embodiments described below address the bleeding edge problem described with reference to FIG. 3. The efficiency and cost-effectiveness of the methods and systems described herein may make them appropriate for real-time or near real-time applications such as simulation, training, and/or real-time imaging applications (e.g., applications where an image must be adjusted in real-time based on user input, such as flight simulation systems, combat simulation systems, etc.).

Referring generally to the figures, a single blur parameter is used to represent both the magnitude of blur that should be applied to an object or pixel and a distance relationship (e.g., near-field, in-focus, or far-field) associated with the object or pixel. In some embodiments, signed blur values are used to represent both blur magnitude and distance relationships, where the magnitude, or absolute value, of the blur value indicates the magnitude of blur and the sign (i.e., positive or negative) of the blur value indicates the distance relationship. In-focus objects may have a blur value at or near zero, near-field objects may have a negative blur value, and far-field objects may have a positive blur value. For example, the blur value may vary between a value of −1 (closest near-field position) and +1 (furthest far-field position). An object with a smaller (or more negative) value than another object would be positioned closer in the field of view (i.e., closer to an observer, camera, sensor, etc. associated with the image) than the other object. An object with a larger (or more positive) value than another object would be positioned further away in the field of view than the other object.

The blur parameter may be determined during a rendering operation in which each primitive (e.g., object) in a scene is rendered into pixels and/or subpixels within a frame buffer and the blur parameter (e.g., signed blur value) is stored along with the pixel color. Encoding both blur magnitude and distance relationship within a single parameter requires less information to be stored, transmitted between components, or processed than using separate parameters, which may enable a system utilizing a single blur parameter to be implemented in a more efficient and/or less costly fashion.

In various embodiments blur magnitude and distance relationships may be represented in different ways. For example, instead of using signed values to indicate distance relationships, an in-focus position may be represented using a base blur value (e.g., a fixed value) and near-field and far-field objects may be represented using blur values with reference to the base blur value. In one example, the blur value may range between 0 and 100, with in-focus objects being represented by a blur value of 50, near-field objects being represented with a value between 0 and 49 (where 0 represents a maximum blur magnitude and/or position closest to the observer), and far-field objects being represented with a value between 51 and 100 (where 100 represents a maximum blur magnitude and/or a position furthest away from the observer). In other embodiments, blur magnitude and distance relationships may be represented using separate parameters. For example, one numerical value may be used to represent blur magnitude and a separate numerical value may be used to represent a distance relationship.

Figure 4:
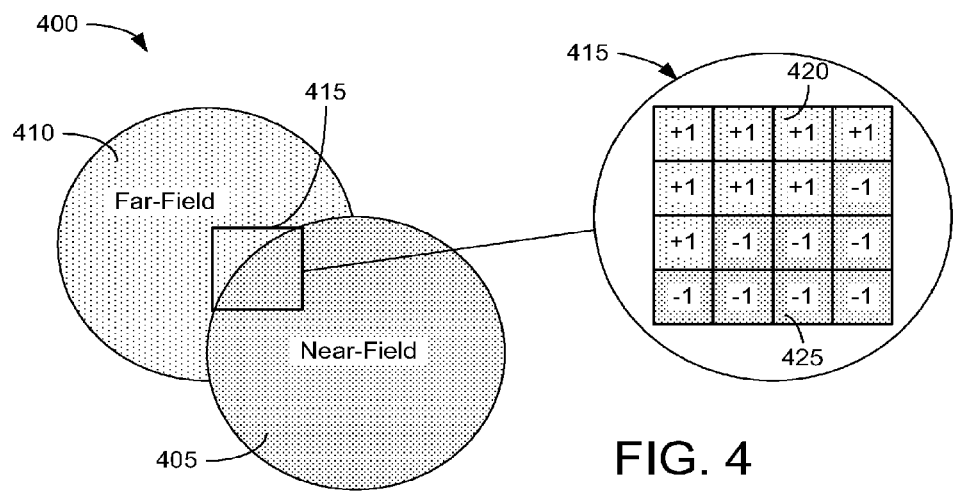
FIG. 4 is a diagram of an image having a depth of field used to illustrate anti-aliasing techniques, according to an exemplary embodiment.

Referring now to FIG. 4, a diagram representing objects in an image 400 having a depth of field is shown according to an exemplary embodiment. In the exemplary embodiment of FIG. 4, the blur value is defined as having a value of −1 for maximum blur in the near-field, 0 for in-focus (i.e., at the focus distance), and +1 for maximum blur in the far-field. Objects 405 and 410 represent overlapping objects in image 400. Object 405 resides at a closest position in the near-field and has a blur value of −1. Object 410 resides at a furthest position in the far-field and has a blur value of +1. Pixel 415 is at an edge of objects 405 and 410 and includes a plurality of subpixels. An enlarged view of pixel 415 is illustrated in FIG. 4 and shows that half of the subpixels of pixel 415 are associated with object 405 and have a blur value of −1 (e.g., subpixel 425) and half of the subpixels are associated with object 410 and have a blur value of +1 (e.g., subpixel 420). The sign of the blur value represents the relative distance (i.e., a negative value represents a near-field position and a positive value represents a far-field position) and the magnitude of the blur value represents the amount of blur associated with the subpixel.

In processing an image for display, an anti-aliasing filter may be applied to establish pixel-level data based on sub-pixel-level data without introducing substantial distortion artifacts. One conventional type of anti-aliasing filter is an anti-aliasing averaging filter that averages the blur values of the subpixels to determine a blur value for a pixel. Traditional anti-aliasing filters (e.g., averaging filters) may work well when operating on pixel color but may be inadequate for blur anti-aliasing. For the exemplary pixel 415 shown in FIG. 4, an anti-aliasing averaging filter would average eight subpixels having a maximum near-field blur value of −1 with eight subpixels having a maximum far-field blur value of +1, resulting in a blur value of 0 for pixel 415. Such an anti-aliasing averaging filter can blend two blurred objects having different distance relationships into a single incorrect in-focus pixel and may cause noticeable visual artifacts in the displayed image.

A blur anti-aliasing filter of various embodiments of the present disclosure preserves distance relationships to avoid the above-mentioned artifacts. The anti-aliasing filter is configured to examine the blur values of the subpixels and to select a blur value for the pixel associated with the closest object in the pixel (e.g., the most negative blur value in the exemplary embodiment shown in FIG. 4). For pixel 415, for example, such an anti-aliasing filter would select a blur value of −1 as it represents the closest near-field subpixel position of all subpixels in pixel 415. In other embodiments, an anti-aliasing filter may be configured to select a blur value associated with the greatest number of subpixels for the pixel. For example, if a pixel has three subpixels with a blur value of −1, three subpixels with a blur value of +1, and ten subpixels with a blur value of −0.3, such an anti-aliasing filter may select a blur value of −0.3 for the pixel. In some embodiments, if an equal number of subpixels share different blur values (e.g., pixel 415, having eight subpixels with a blur value of −1 and eight subpixels with a blur value of +1) such ties may be resolved in favor of the subpixel blur value representing the closer position in the field of vision (e.g., a blur value of −1 in FIG. 4).

In still further embodiments, anti-aliasing filters may be configured to consider yet other relationships of sub-pixels within a pixel to determine a blur value for the pixel. For example, if the distribution of subpixel blur values is skewed towards a far-field position, the blur value may be set to a far-field position. In some embodiments, a voting scheme may be used to allow the dominant primitive in the pixel to more heavily influence the final blur value for the pixel.

Figure 5:
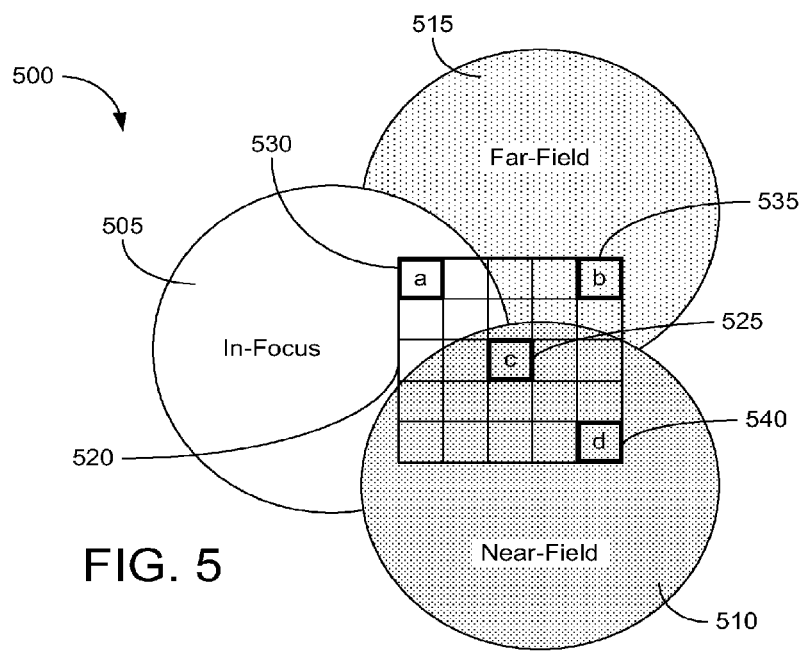
FIG. 5 is a diagram of an image having a depth of field used to illustrate operation of a spatially variant filter, according to an exemplary embodiment.

Referring now to FIG. 5, a diagram representing objects in an image 500 having a depth of field is shown according to an exemplary embodiment. Image 500 includes an in-focus object 505, a near-field object 510, and a far-field object 515. FIG. 5 also illustrates a pixel grid 520 associated with the kernel of a spatially variant convolution filter. The spatially variant filter may be used to apply the blur values for each pixel and generate the depth of field effect in an image. The spatially variant filter may utilize one or more weights to simulate the depth of field, where the weights are values that determine the actual amount of blur and/or color that is applied to each pixel using the spatially variant filter. The spatially variant filter described with reference to FIGS. 5 and 6 may operate by altering the weights underneath the filter based on both the blur magnitude and the distance relationship with neighboring pixels. In some embodiments, the size of the spatially variant filter may not be altered. In some embodiments, a standard convolution filter may be utilized to perform the blurring operation and the distance relationships may be taken into account by altering the weighting values associated with the filter.

Referring again to FIG. 5, grid 520 includes a center pixel 525 as well as several neighboring pixels, including pixels 530, 535, and 540. Grid 520 represents pixels that are considered in determining a weight for the spatially variant filter associated with center pixel 525. Each pixel in an image may be analyzed based on its neighboring pixels to determine the weights underlying the spatially variant filter (e.g., the grid may be "scanned" across the image such that each pixel of the image is analyzed as the center pixel at some point during the scanning operation). The blur value for each pixel within the filter kernel grid may be compared with the blur value of the center pixel. If the blur value of the grid pixel being analyzed is associated with a closer position in the field of view than the blur value of the center pixel (e.g., the grid pixel has a smaller or more negative blur value) the magnitude of the blur value can be used to influence the weight of the filter associated with the grid pixel. If the blur value of the grid pixel being analyzed is associated with a position that is further away than the blur value of the center pixel, the blur value of the compared grid pixel may be ignored.

In some embodiments, the filter kernel may be made spatially variant by changing the amplitude, or shape, of the filter kernel. For example, initial weight values associated with a particular kernel shape (e.g., box, conical, pyramid, etc.) may be defined and may be altered based on blur values of the pixels under the kernel, effectively changing the shape of the filter. One such exemplary embodiment is discussed herein with reference to FIG. 6B.

In other embodiments, the filter kernel may be made spatially variant by altering (e.g., reducing) the size of the filter kernel. For example, the filter kernel may initially be defined to have a size configured to apply a maximum blur to an image (e.g., 11×11 pixels) and the size of the filter kernel may be reduced based on the blur values of the pixels (e.g., to 9×9 pixels, 7×7 pixels, 5×5 pixels, 3×3 pixels, 1 pixel, etc.). In still further embodiments, the filter kernel may be made spatially variant by altering both its size and its shape.

In FIG. 5, center pixel 525 is associated with near-field object 510. Pixel 530 is associated with in-focus object 505, which is further away than near-field object 510 that is associated with center pixel 525, and the weight associated with in-focus object 505 is zero. Accordingly, the blur value and/or color of pixel 530 does not affect the spatially variant filter kernel weight associated with center pixel 525. Pixel 535 is associated with far-field object 515, which is also further away than near-field object 510. Even though pixel 535 is a blurred pixel (as it is outside of the depth of field range), it should not contribute to the blur and/or color of pixels lying on the closer near-field object 510. Pixel 540 has the same blur value as center pixel 525 (and, accordingly, is not further away from the observer than pixel 525) so it may contribute part of its blur value and/or color to the filter weight associated with center pixel 525.

Figure 6A:
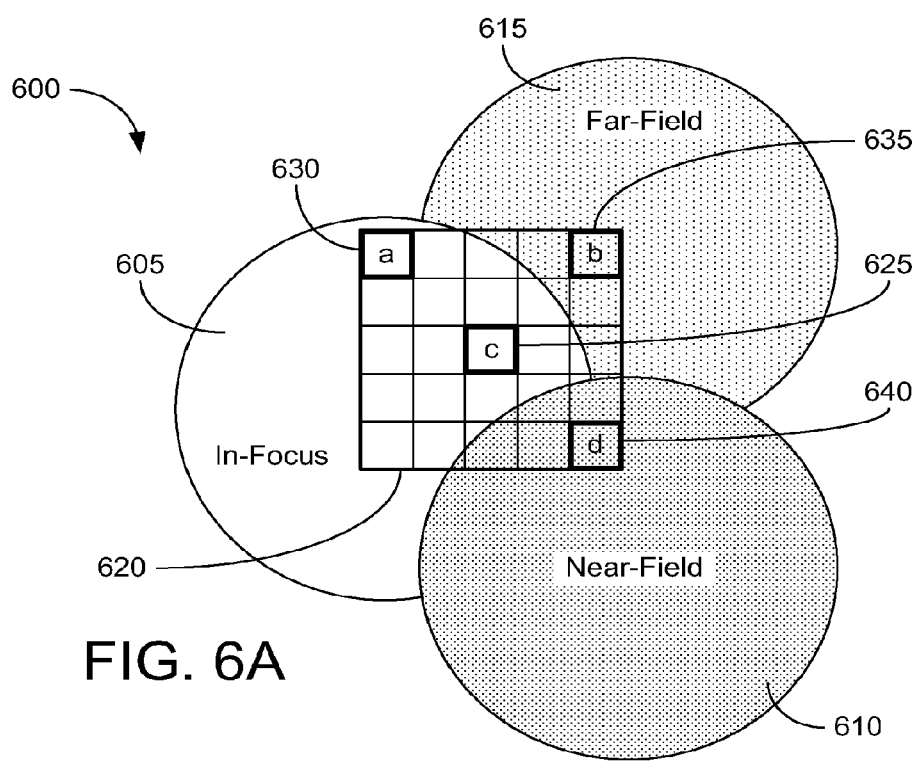
FIG. 6A is a diagram of an image having a depth of field used to illustrate operation of a spatially variant filter where a filter kernel is placed at a different position than that shown in FIG. 5, according to an exemplary embodiment.

Referring now to FIG. 6A, a diagram representing objects in an image 600 having a depth of field is shown according to an exemplary embodiment. The scene shown in FIG. 6A is similar to that shown in FIG. 5, but the filter kernel grid 620 is at a different position (i.e., has a different center pixel 625). Center pixel 625 now lies over an in-focus object 605. Pixel 630 is associated with the same in-focus object 605 (and has the same blur value) as center pixel 625 and may contribute to the filter weight associated with center pixel 625. However, because pixel 630 (as well as pixel 625) is in focus, pixel 630 has little or no blur to contribute to the filter weight of pixel 625 and pixel 630 does not substantially alter the color of center pixel 625. Pixel 635 is associated with far-field object 615 and is further away in the field of vision than center pixel 625, so pixel 635 does not contribute to the weight of pixel 625. Pixel 640 is associated with near-field object 610 and has a blur value indicating it is closer to the observer than center pixel 625, and pixel 640 is a blurry pixel, so pixel 640 contributes to the filter weight associated with center pixel 625.

In some embodiments, the spatially variant filter may utilize a smoothing function that is applied to the filter kernel to smooth and/or normalize weights between groups of adjacent pixels. Without such a smoothing function, aliasing artifacts may appear in the image along edges of overlapping objects from different distance bands (e.g., near-field, in-focus, and far-field). A smoothing function may help prevent such aliasing artifacts.

In some embodiments, the spatially variant filter may be implemented using a blur comparison filter, a normalizing circuit, and a final convolution filter. The blur comparison filter is configured to analyze each pixel (e.g., iteratively, sequentially, randomly, etc.) in relation to the blur values of its neighboring pixels and determine an initial filter weight to be associated with each pixel. The normalizing circuit is configured to determine a normalizing parameter (e.g., based on the sum of the weights) so overall brightness of the scene is substantially unaltered. The convolution filter is configured to perform blurring on pixels of the image based on the final determined filter weights and generate the final image having the simulated depth of field. The final image is then sent to a display (e.g., via one or more further image processing steps, hardware display engines, encoders, etc.) to be viewed by a user.

Figure 6B:
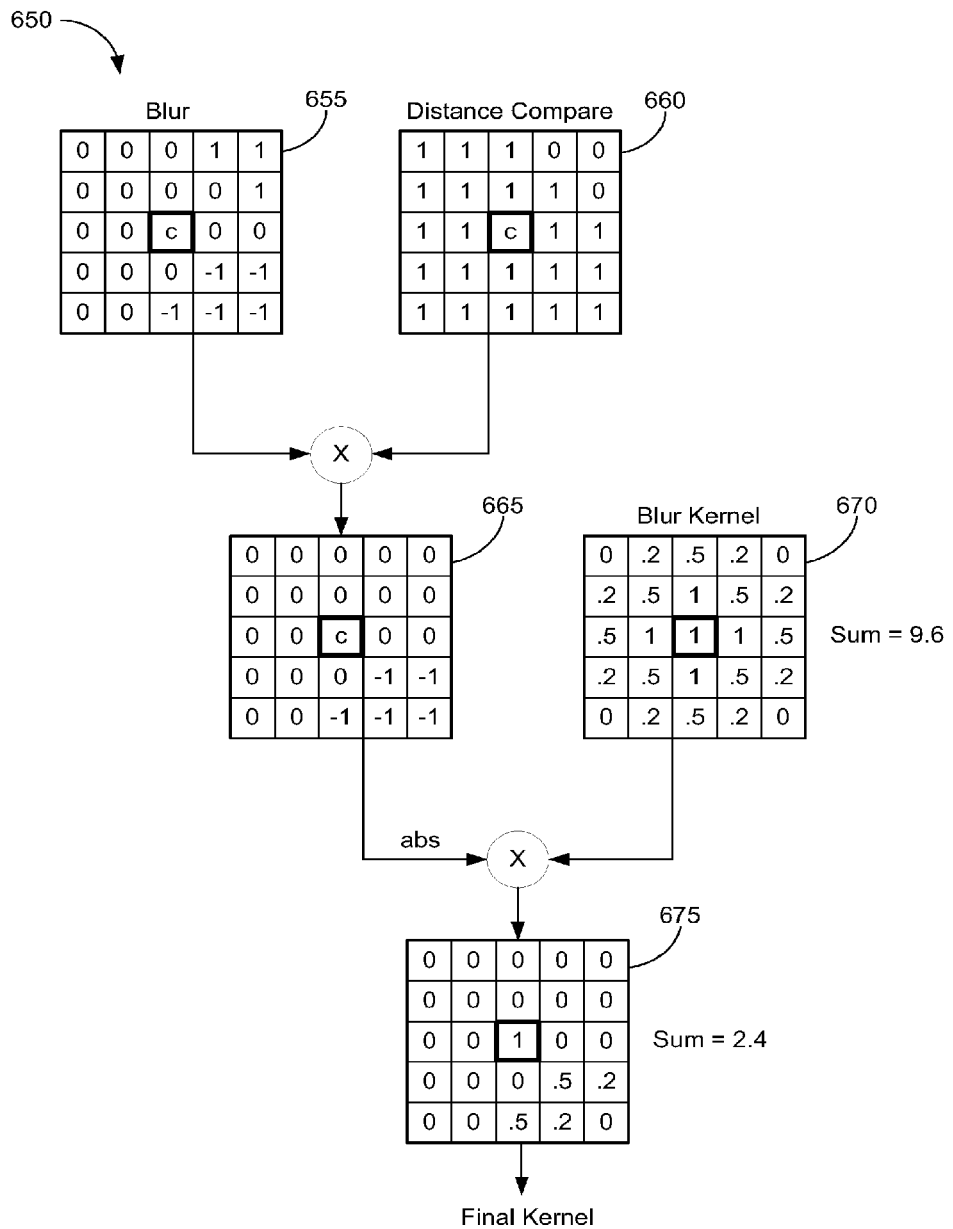
FIG. 6B is an illustration of the application of the spatially variant filter of FIG. 6A to apply blur to an image, according to an exemplary embodiment.

Referring now to FIG. 6B, an illustration of the application of the spatially variant filter shown in FIG. 6A to apply blur to an image is shown according to an exemplary embodiment. The filter kernel shown in FIG. 6B may slide across an image (e.g., as transmitted through a frame buffer) as the pixels are streamed to a display. The current active pixel being sent to the display may be the center pixel (labeled "c" in the filter kernels illustrated in FIG. 6B).

Blur grid 655 illustrates blur values that may be associated with pixels under filter kernel grid 620 shown in FIG. 6A. In this embodiment, near-field object 610 resides at a closest position in the near-field and has a blur value of −1. Far-field object 615 resides at a furthest position in the far-field and has a blur value of +1. In-focus object 605 resides at the focus depth and has a blur value of zero. Pixels in the upper-right corner of blur grid 655 include far-field object 615 and have a blur value of 1, pixels in the lower-right corner of blur grid 655 include near-field object 610 and have a blur value of −1, and the remaining pixels in blur grid 655 include in-focus object 605 and have a blur value of zero.

The relative distances of the center pixel and the neighboring pixels in blur grid 655 are compared to determine whether the neighboring pixels will contribute to the color of the center pixel. Distance comparison grid 660 illustrates the results of the comparison of the relative distances in blur grid 655. In the illustrated embodiment, a pixel is given a comparison value of zero if it is further away than the center pixel within a field of view and a comparison value of one if it is at the same distance or closer within a field of view than the center pixel. The pixels in the upper-right corner of distance comparison grid 660 are associated with far-field object 615, which is further away in the field of view than in-focus object 605 associated with the center pixel. The center pixel has a blur value of zero and the upper-right pixels have blur values of 1. Distance comparison grid 660 includes a value of zero for these pixels, indicating that they are not allowed to contribute to the final color of the center pixel. The remaining pixels are associated either with in-focus object 605 or near-field object 610 and are at the same depth or closer in the field of view than the center pixel. Distance comparison grid 660 includes a value of 1 for these pixels, indicating that they may contribute to the final color of the center pixel.

The values of blur grid 655 are multiplied with the values corresponding to the same pixels in distance comparison grid 660 to obtain an intermediate blur grid 665. Intermediate blur grid 665 includes the blur values that may contribute to the determination of the final color of the center pixel.

Initial kernel weight grid 670 illustrates the initial weights defined for the filter kernel for a fully defocused blur shape (e.g., box, conical, pyramid, etc.). The weights illustrated in initial kernel weight grid 670 define the initial bokeh, or shape, of the filter kernel.

The absolute value of each of the blur values shown in intermediate blur grid 665 is multiplied with the weight of the corresponding pixel shown in initial kernel weight grid 670 to arrive at a final filter kernel grid 675. If the blur values were 1 (or −1) for all pixels in intermediate blur grid 665 the maximum blur would be applied to the center pixel. In the illustrated embodiment, four pixels near the lower-right corner of final filter kernel grid 675 (in addition to the center pixel) affect the final color of the center pixel.

Final filter kernel grid 675 may be used to apply blur to the center pixel being processed. The weight of each pixel within final filter kernel grid 675 may be multiplied by the frame buffer color of the associated pixel. These products may then be summed together. The colors are then normalized by dividing the sum of the products by the sum of the final weights shown in final filter kernel grid 675 (i.e., 2.4).

Figure 7:
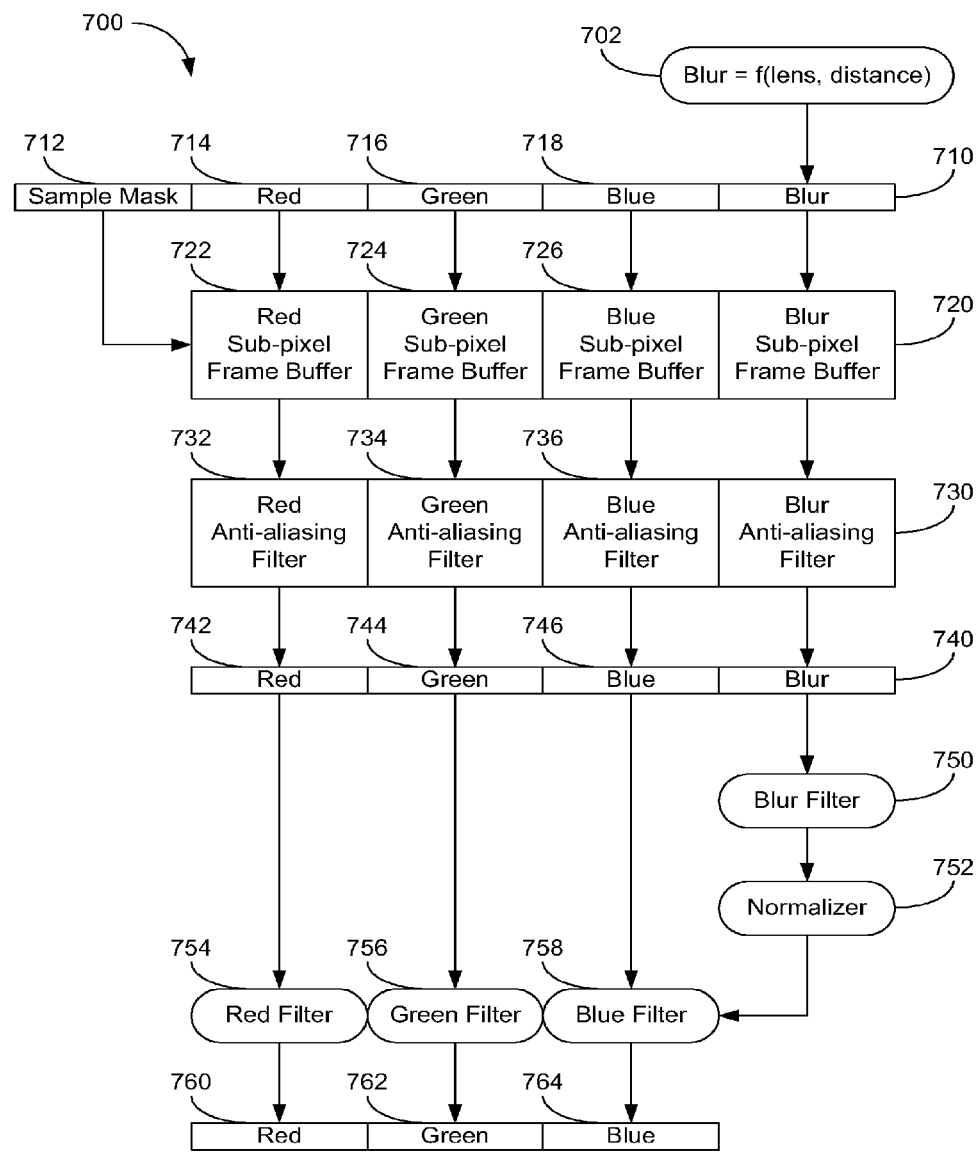
FIG. 7 is a diagram of a system for generating an image having a depth of field, according to an exemplary embodiment.

Referring now to FIG. 7, a system 700 for generating an image having a depth of field is shown according to an exemplary embodiment. In some embodiments, system 700 may be used to determine blur values for pixels of an image and apply the blur to the image in a single pass (e.g., such that blur values are not determined during a first rendering pass and blur applied during a separate filtering pass). A rendering engine 702 is configured to determine a blur value associated with each subpixel in the image. In some embodiments, a single blur parameter (e.g., a signed blur value) is encoded to include both a blur magnitude and distance relationship associated with a subpixel. The blur value may be based on the distance to the subpixel being rendered (e.g., a distance away from a focus distance) and lens characteristics (e.g., f-stop, focal length, magnification, focus distance, etc.). The blur value is calculated using an equation similar to that shown with reference to FIG. 1. The blur value is transmitted to a depth buffer 710 and a frame buffer 720 with the color of the object being rendered. Depth buffer 710 may include a sample mask 712 that defines which of the subpixels within each pixel are covered by the primitive being rendered.

Once the scene has been rendered, data from the subpixel-level frame buffer 720 is provided to an anti-aliasing filter 730. Anti-aliasing filter may use techniques such as those discussed with respect to FIG. 4 to determine the blur values associated with each pixel, for instance, based on the values associated with its subpixels.

The actual blurring is performed by a spatially variant filter including a blur comparison filter 750, normalizing circuit 752, and convolution blurring filter (filters 754, 756, and 758, collectively). Blur comparison filter 750 is configured to compare the blur value of each pixel to blur values of neighboring pixels and determine a filter weight value associated with each pixel. Normalizing circuit 752 is configured to determine a normalizing parameter based on the weight values to ensure the brightness of the scene is not substantially altered. Convolution blurring filters 754, 756, and 758 are configured to apply the blurring effect to the pixel colors and generate the final image to be displayed.

Figure 8:
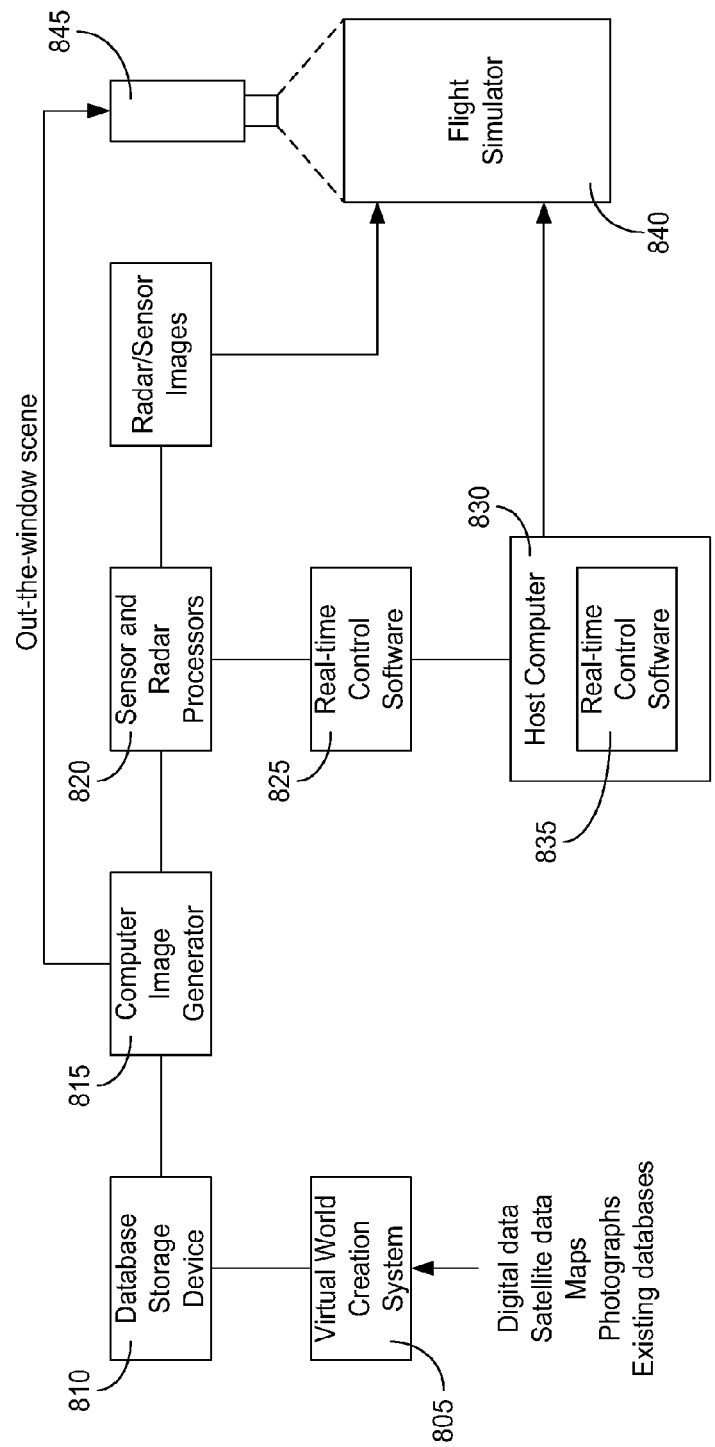
FIG. 8 is a block diagram of a flight simulation system that utilizes an image generation circuit configured to generate an image having a depth of field, according to an exemplary embodiment.

Referring now to FIG. 8, a block diagram of a flight simulation system 800 is shown according to an exemplary embodiment. System 800 utilizes a image generation circuit 815 to generate an image having a simulated depth of field. The image may be transmitted to a display device 845 and may be used within a flight simulation to represent images that may be captured, for example, using an image-based sensor of an aircraft. Image generation circuit 815 may utilize and/or include various systems and methods described herein, such as system 700.

System 800 includes a virtual world creation system 805 configured to generate a virtual environment in which a flight simulation will take place. In some embodiments, virtual world creation system 805 is configured to generate the virtual environment based on data relating to a real environment or designed environment, such as digital data, satellite data, map data, photographical data, existing databases (e.g., geographic databases, landmark databases, etc.), and/or other information. Data relating to the created virtual environment is stored in a database storage device 810.

Image generation circuit 815 is configured to generate an image having a simulated depth of field for display to a user of system 800. The image may be displayed on a display 845 and/or a different display (e.g., a dedicated aircraft sensor display). Display 845 may be a CRT display, LCD display, projector, or any other type of display. Image generation circuit 815 may generate the image based on data stored in database storage device 810. In some embodiments, image generation circuit 815 is configured to generate both an image of the virtual scene outside the windshield of an aircraft and an image that would be generated by an aircraft sensor (e.g., a video camera, an image sensor, etc.).

Image generation circuit 815 may utilize various methods described herein to generate an image having a simulated depth of field. For example, image generation circuit 815 may include a rendering engine configured to generate one or more blur parameters related to the image, objects within the image, pixels within the image, subpixels of the pixels, etc. In some embodiments, the rendering engine generates a single blur parameter (e.g., a signed blur value) configured to encode both a blur magnitude and a distance relationship.

Image generation circuit 815 may also include an anti-aliasing filter configured to determine a blur value for each pixel based on subpixel-level data in a manner that preserves distance relationships between objects in the scene and avoids introducing substantial distortion artifacts. In some embodiments, the anti-aliasing filter is configured to select a blur value for a pixel from among the blur values of its subpixels that is associated with the closest object in the pixel. In other embodiments, the anti-aliasing filter is configured to select the blur value associated with the most subpixels of the pixel. In other embodiments, the anti-aliasing filter is configured to determine a blur value for each pixel using other methods, such as methods that account for the relationship between subpixels within a pixel to determine a blur value for the pixel.

Image generation circuit 815 may also include an image processing circuit configured to calibrate and apply a spatially variant filter (e.g., a convolution filter) to simulate a depth of field in an image. In some embodiments, the image processing circuit includes a blur comparison filter configured to determine weights underlying the filter kernel for each pixel of the image based on a blur magnitude and a distance relationship of neighboring pixels. The image processing circuit may also include a normalization circuit configured to derive a normalizing parameter based on the weight values to prevent the overall brightness of the scene from being altered. The image processing circuit may also include a filter circuit, such as a convolution blurring filter, configured to apply blurring to the image to simulate the depth of field. The image having the simulated depth of field may then be sent to one or both of display 845 and sensor processor 820 for display to a user of flight simulator 840.

Sensor processor 820 may be configured to simulate one or more displays related to sensors of the aircraft being simulated using flight simulator 840. For example, sensor processor 820 may be configured to generate virtual instrumentation displays to display readings that may appear on sensors of an aircraft during flight conditions being simulated. In some embodiments, sensor processor 820 is configured to display one or more images having a simulated depth of field generated by image generation circuit 815.

Real-time control software 825 and 835 is configured to control images displayed in flight simulator 840 and mechanical movements of flight simulator 840 to simulate actual flight conditions. Software 825 and 835 is configured to operate in real-time or near real-time and react to inputs from a user, simulated flight conditions, etc. to change the images being presented in flight simulator 840 and/or mechanical positions of flight simulator 840. For example, Software 825 and 835 may be configured to provide information to image generation circuit 815 that may be used to determine subsequent images that should be generated and displayed. By operating in real-time or near real-time, software 825 and/or 835 enables flight simulator 840 to simulate an experience similar to that which a pilot may actually experience if piloting an aircraft.

Figure 9:
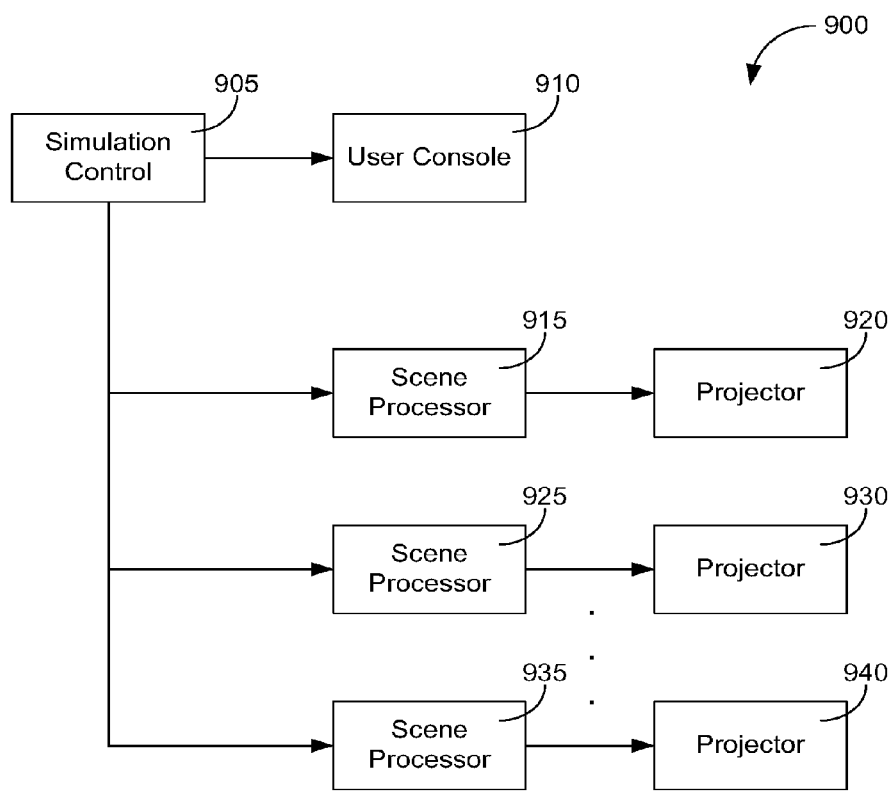
FIG. 9 is a block diagram of a system for displaying an image having a depth of field, according to an exemplary embodiment.

Referring now to FIG. 9, a block diagram of a system 900 for displaying an image having a depth of field is shown according to an exemplary embodiment. System 900 includes a plurality of projectors (e.g., 920, 930, and 940) configured to display different portions of a scene to a user. For example, projector 920 may be configured to display a portion of the scene directly in front of the simulated aircraft and projectors 930 and 940 may be configured to display the portions of the scene to the side of the aircraft. The scene that should be displayed on each projector may be determined and/or processed for display using an associated scene processor (e.g., scene processors 915, 925, and 935). Simulation control 905 may provide data used to determine what images should be displayed on projectors 920, 930, and 940 and may be configured to cause changes to the displayed images based on input received from a user via a user console 910. In some embodiments, system 900 may be integrated with an image generation circuit such as image generation circuit 815 and/or utilize a system such as system 700.

Figure 10:
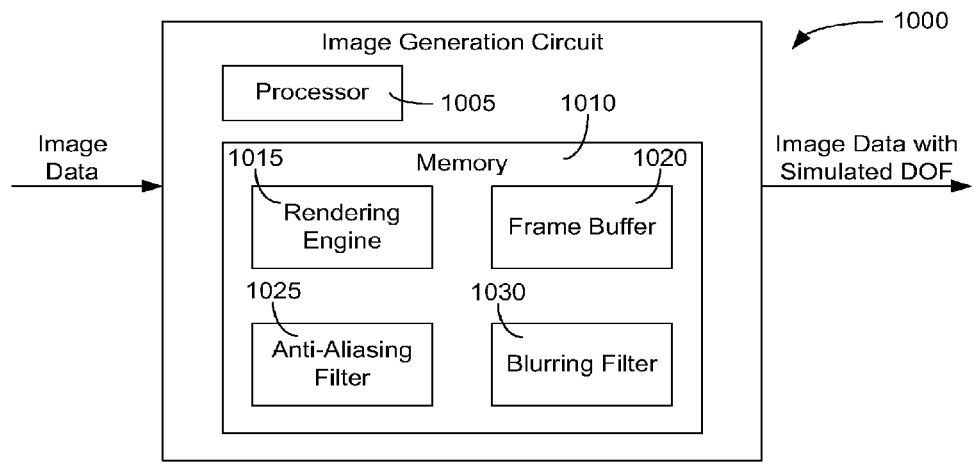
FIG. 10 is a block diagram of an image generation circuit, according to an exemplary embodiment.

Referring now to FIG. 10, a block diagram of an image generation circuit 1000 configured to generate an image having a simulated depth of field is shown according to an exemplary embodiment. In some embodiments, image generation circuit 1000 may be implemented in simulation and/or training systems such as flight simulation system 800. In other embodiments, image generation circuit 1000 may be configured to generate images relating to other applications, such as medical or other types of imaging systems.

Image generation circuit 1000 includes a processor 1005 and a memory 1010. Processor 1005 may be any type of general purpose or special purpose processor (e.g., an FPGA custom processor). Memory 1010 may be any type of machine-readable medium. Memory 1010 may include one or more modules configured to control certain functions of image generation circuit 1000. For example, memory 1010 may include a rendering engine 1015. Rendering engine 1015 may be configured to determine one or more blur parameters for each of a plurality of objects represented by an image. In some embodiments, rendering engine 1015 may be configured to determine a single blur parameter for each of the plurality of objects that represents both a magnitude of blur and a relative distance with respect to a lens focal distance being simulated by image generation circuit 1000. The blur parameters may be stored (e.g., at an object, pixel, and/or subpixel level) within a frame buffer 1020.

Memory 1010 may include an anti-aliasing filter 1025. Anti-aliasing filter 1025 may be configured to retrieve a blur value and a relative distance for each of a plurality of subpixels of each pixel of an image (e.g., from frame buffer 1020). Anti-aliasing filter 1025 may be configured to determine an anti-aliasing output for each pixel based on the blur values and relative distances of the subpixels of the pixel. The anti-aliasing output may be determined using a non-averaging method such that the blur values of the subpixels are not averaged to determine the anti-aliasing output of the pixel. In some embodiments, the anti-aliasing output may be a blur value or blur parameter for each pixel. Anti-aliasing filter 1025 may be configured to provide the determined anti-aliasing output for each pixel to another module for use in generating and/or displaying an image having a simulated depth of field.

Memory 1010 may include a blurring filter 1030. Blurring filter 1030 may be configured to simulate depth of field in an image using a spatially variant filter. The spatially variant filter may have weight values associated with one or more pixels of the image. Each weight value may be based on a blur magnitude and a relative distance for one or more neighboring pixels. The spatially variant filter may be configured to blur one or more pixels of the image to achieve the simulated depth of field.

Figure 11:
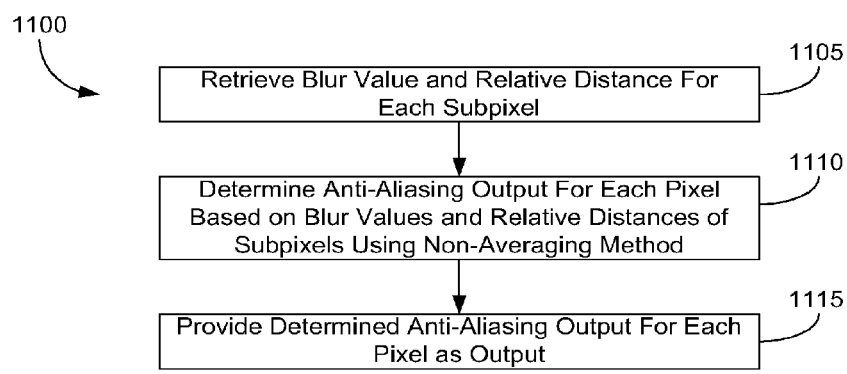
FIG. 11 is a flow diagram of a process for anti-aliasing an image having a plurality of pixels and a plurality of objects represented therein, according to an exemplary embodiment.

Referring now to FIG. 11, a flow diagram of a process 1100 for anti-aliasing an image having a plurality of pixels and a plurality of objects represented therein is shown according to an exemplary embodiment. Process 1100 may be performed using an image generation circuit such as circuit 1000. The image generation circuit may retrieve a blur value and a relative distance for each of a plurality of subpixels of each pixel (step 1105). The image generation circuit may determine an anti-aliasing output for each pixel based on blur values and relative distances of the subpixels (step 1110). The anti-aliasing outputs may be determined using a non-averaging method such that the blur values of the subpixels are not averaged to determine the anti-aliasing output of the pixel. For example, if the anti-aliasing output being determined is a blur value for the pixel, the image generation circuit may select the blur parameter of a subpixel that is associated with a closest position of the plurality of subpixels of the pixel within a field of view of the image. In another embodiment, the image generation circuit may select a blur parameter associated with a greatest number of subpixels from among the plurality of subpixels of the pixel. The image generation module may provide the determined anti-aliasing output for each pixel as an output to be used in generating and/or displaying an image having a simulated depth of field (step 1115).

Figure 12:
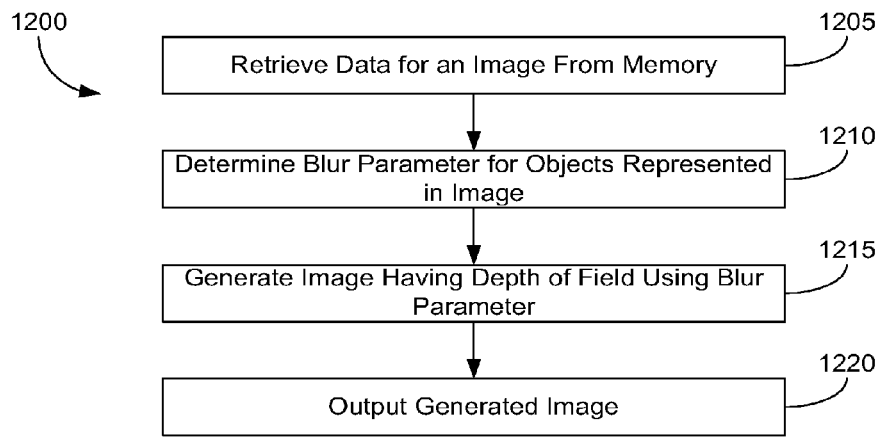
FIG. 12 is a flow diagram of a process for simulating depth of field in a computer graphics display using a blur parameter, according to an exemplary embodiment.

Referring now to FIG. 12, a flow diagram of a process 1200 for simulating depth of field in a computer graphics display is shown according to an exemplary embodiment. Process 1200 may be performed using an image generation circuit such as circuit 1000. At step 1205, the image generation circuit retrieves data relating to an image from a memory. The data is used to determine a blur parameter for objects represented in the image and/or image data (step 1210). In some embodiments, a single blur parameter is used to represent both a magnitude of blur and a relative distance with respect to a lens focal distance being simulated by the image generation circuit. The image generation circuit generates an image having a simulated depth of field using the blur parameters for the objects (step 1215). The image generation circuit may output the generated image (e.g., to a display) (step 1220).

Figure 13:
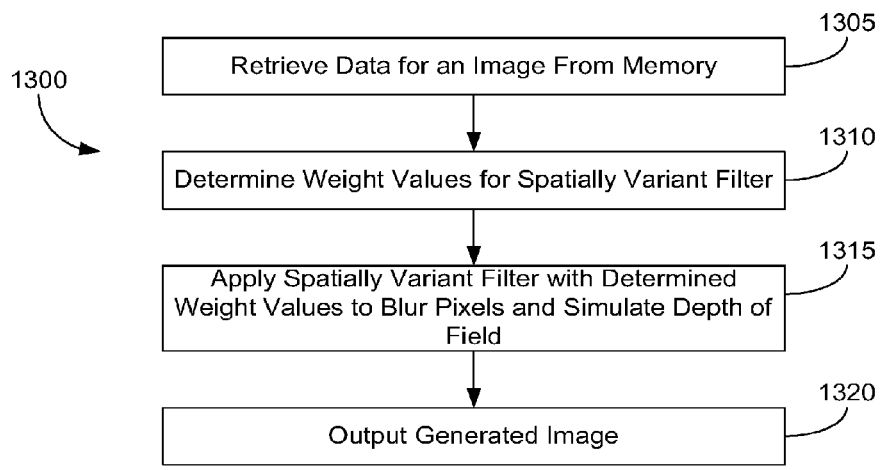
FIG. 13 is a flow diagram of a process for simulating depth of field in a computer graphics display using a spatially variant filter, according to an exemplary embodiment.

Referring now to FIG. 13, a flow diagram of a process 1300 for simulating depth of field in a computer graphics display is shown according to an exemplary embodiment. Process 1300 may be performed using an image generation circuit such as circuit 1000. At step 1305, the image generation circuit retrieves data relating to an image from a memory. The data may be used to determine a blur parameter for objects represented in the image and/or image data. In some embodiments, a single blur parameter is used to represent both a magnitude of blur and a relative distance with respect to a lens focal distance being simulated by the image generation circuit. At step 1310, the image generation circuit determines weight values for a spatially variant filter associated with one or more pixels of the image. The weight values may determine the actual amount of blur that is applied to each pixel upon application of the spatially variant filter. The weight value of a selected pixel may be determined based on a blur magnitude and relative distance for one or more neighboring pixels. In some embodiments, the weight values may be determined by scanning a filter kernel over pixels of the image, such that a first pixel under the kernel is selected and compared to a second neighboring pixel under the kernel to determine the weight value. In some embodiments, the weight associated with the first pixel may be based on the blur magnitude of the second pixel if the relative distance of the second pixel indicates that the second pixel is at a closer position within a field of view of the image than the first pixel. At step 1315, the spatially variant filter with the determined weight values is applied to the image to blur pixels of the image and simulate depth of field. The image generation circuit may output the generated image having the simulated depth of field (e.g., to a display) (step 1320).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system for simulating depth of field in a computer graphics display, comprising:
    an image generation circuit configured to generate an image representing a plurality of objects for display on the computer graphics display, wherein the image generation circuit is configured to generate the image using a single blur parameter for each of the plurality of objects that represents both a magnitude of blur and a relative distance with respect to a lens focal distance being simulated by the image generation circuit;
    wherein the relative distance represents whether the object is in a far-field, in-focus, or near-field position with respect to the focal distance;
    wherein the blur parameter is a base blur parameter value for in-focus objects, a higher value than the base blur parameter value for far-field objects, and a lower value than the base blur parameter value for near-field objects.

2. The system of claim 1, wherein the blur parameter is a positive value for far-field objects and a negative value for near-field objects.

3. The system of claim 1, wherein the computer graphics display is part of a flight simulation system.

4. The system of claim 1, wherein the image is generated using a single rendering pass and without the use of either ray tracing or accumulation buffers.

5. A system for simulating depth of field in a computer graphics display, comprising:
    an image generation circuit configured to generate an image representing a plurality of objects for display on the computer graphics display, wherein the image generation circuit is configured to generate the image using a single blur parameter for each of the plurality of objects that represents both a magnitude of blur and a relative distance with respect to a lens focal distance being simulated by the image generation circuit;
    wherein the relative distance represents whether the object is in a far-field, in-focus, or near-field position with respect to the focal distance;
    wherein the blur parameter is a base blur parameter value for in-focus objects, a lower value than the base blur parameter value for far-field objects, and a higher value than the base blur parameter value for near-field objects.

6. The system of claim 5, wherein the blur parameter is a negative value for far-field objects and a positive value for near-field objects.

7. A method of anti-aliasing an image, the image having a plurality of pixels and a plurality of objects represented therein, comprising:
    using an image generation circuit to generate an image representing the plurality of objects for display on the computer graphics display;
    using properties of the objects to retrieve a blur value and a relative distance for each of a plurality of subpixels of each pixel, wherein the relative distance represents whether an object associated with the subpixel is in a far-field, in-focus, or near-field position with respect to a focal distance of the image;
    determining an anti-aliasing output for one or more pixels based on the blur values and relative distances of the subpixels of the pixel, wherein the anti-aliasing output for each pixel is determined using a non-averaging method such that the blur values of the subpixels are not averaged to determine the anti-aliasing output of the pixel; and
    providing the determined anti-aliasing output for each pixel;
    wherein the anti-aliasing output is a base anti-aliasing output for pixels associated with in-focus objects, a lower value than the base anti-aliasing output for pixels associated with far-field objects, and a higher value than the base anti-aliasing value for pixels associated with near-field objects.

8. The method of claim 7, further comprising:
    determining an anti-aliasing color output for each pixel using an averaging method such that color values of the subpixels of the pixel are averaged to determine the anti-aliasing color output of the pixel.

9. The method of claim 7, wherein the determined anti-aliasing output for each pixel is a blur value for the pixel.

10. The method of claim 9, wherein determining a blur value for each pixel comprises selecting the blur parameter of a subpixel that is associated with a closest position of the plurality of subpixels of the pixel within a field of view of the image.

11. The method of claim 9, wherein determining a blur value for each pixel comprises selecting a blur parameter associated with a greatest number of subpixels from among the plurality of subpixels of the pixel.

12. The method of claim 7, wherein blur value and relative distance are represented using a single blur parameter.

13. The method of claim 7, wherein the image is displayed on a flight simulation system.

14. The method of claim 7, wherein the anti-aliasing output is a blur parameter representing both the blur value and the relative distance.

* * * * *